(12) United States Patent
Wagner et al.

(10) Patent No.: US 8,567,821 B1
(45) Date of Patent: *Oct. 29, 2013

(54) TUBULAR BEAM WITH A CRIMPED SLEEVE

(75) Inventors: David Anthony Wagner, Northville, MI (US); Ari Garo Callskan, Canton, MI (US); John Edward Huber, Novi, MI (US); Yuksel Gur, Ann Arbor, MI (US); Michael M. Azzouz, Livonia, MI (US); Jeffrey A. Wallace, Walled Lake, MI (US); Parameswararao Pothuraju, Canton, MI (US); Sunil K. Kasaragod, Canton, MI (US); Xiaoming Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,920

(22) Filed: Apr. 20, 2012

(51) Int. Cl.
*B62D 21/00* (2006.01)
(52) U.S. Cl.
USPC .......................................... 280/781; 280/796

(58) Field of Classification Search
USPC .............. 280/781, 796, 800; 296/203.01, 205
See application file for complete search history.

(56) References Cited

U.S. PATENT DOCUMENTS

| | | | | |
|---|---|---|---|---|
| 2,558,529 | A * | 6/1951 | Thornley | ....................... 405/245 |
| 5,387,016 | A * | 2/1995 | Joseph et al. | ............. 285/148.16 |
| 6,255,631 | B1 * | 7/2001 | Kichline et al. | ............... 219/617 |
| 6,701,598 | B2 * | 3/2004 | Chen et al. | ..................... 29/421.1 |
| 6,935,657 | B2 * | 8/2005 | Kondou et al. | ................ 280/777 |
| 7,127,816 | B2 | 10/2006 | Kiehl | |
| 7,144,040 | B2 | 12/2006 | Kiehl et al. | |
| 7,497,470 | B2 * | 3/2009 | Streng et al. | ................... 280/777 |
| 7,654,571 | B2 | 2/2010 | Gabbianelli et al. | |
| 7,828,329 | B2 | 11/2010 | Biscan | |
| 2013/0026793 | A1 * | 1/2013 | Wagner et al. | ........... 296/203.01 |

* cited by examiner

*Primary Examiner* — Faye M. Fleming
(74) *Attorney, Agent, or Firm* — Raymond L. Coppiellie; Brooks Kushman P.C.

(57) ABSTRACT

An aluminum tubular beam is assembled to a steel box frame rail with a steel sleeve. The sleeve is connected by a crimp joint or by a hem flange to the tubular beam. The steel sleeve may be effectively welded to the steel box frame rail to which it is assembled. An adhesive may be provided between the sleeve and the beam.

20 Claims, 3 Drawing Sheets

TUBULAR BEAM WITH A CRIMPED SLEEVE

TECHNICAL FIELD

This disclosure relates to beams or tubular components of a vehicle that are made of lightweight material to which a sleeve of a different material is attached by a crimp joint.

BACKGROUND

The use of lightweight materials is an efficient way to reduce weight and improve fuel economy in vehicles. Aluminum is a promising material that can achieve 40% weight reduction while still meeting structural performance targets. For example, aluminum cross members may be used as components for lightweight truck frames. Joining aluminum cross members to steel frame rails however presents a challenge especially when the cross member is a closed section component. Pieced together joints are stiff and do not maximize weight reduction for closed section components and cross members.

Joining technology for assembling steel cross members and steel rails is well established and reliable. Generally, openings are cut through steel rails, steel cross members are placed into the openings, and are then MIG welded together. On the other hand, MIG welding aluminum cross members to steel rails is a challenging task that requires special welding techniques and equipment.

The above challenges and problems are addressed by this disclosure as well as other problems as summarized below.

SUMMARY

The general idea for this proposed solution is to join an aluminum tubular component, or cross member, with steel sleeves at the ends of the tubular component. While the general idea encompasses aluminum tubular components, the solution is also applicable to fiber reinforced composites, such as fiberglass or carbon fiber composite parts. Steel sleeves are crimped to a tubular component to prevent relative movement between the aluminum tube and the steel sleeves. Current processes for joining a steel cross member to steel rail can be used to join the steel sleeves to a steel rail.

Three approaches are proposed for applying steel sleeves to aluminum cross members with rectangular cross sections. In the first approach, an aluminum cross member is placed inside of a steel sleeve with close fit. The sleeve and the tubular component are assembled and crimped together to form a double layer portion. Two band-shape crimps may be provided near the end of the tube to join the aluminum tube with the steel sleeves. In a second approach, the aluminum cross member may be first placed inside of steel sleeves and crimped with a spline type of crimp that is applied near the end of the tube to the assembled double layer portion of the tube. The third approach is to first place the tubular cross member inside a steel sleeve. An end of either the steel sleeve or the aluminum tubular component is hemmed over the end of the assembly. The corners of the steel sleeve or aluminum tubular component may be removed. The remaining flanges are hemmed to secure the sleeve to the end of the aluminum tube.

According to one aspect of this disclosure, an assembly is provided that comprises an aluminum tubular beam and a steel sleeve that is assembled over a portion of the beam. A crimp interlocks the sleeve to the beam to provide a sleeve/beam assembly. A steel rail defining an opening receives the sleeve/beam assembly and a weld secures the sleeve/beam assembly to the rail.

The edge of the aluminum tube may stop short of the edge of the steel sleeve to leave only a single layer of steel at the end of the assembly. The single layer of steel may be joined to a steel rail in accordance with current welding processes.

According to other aspects of this disclosure as it relates to the above assembly, an adhesive may be applied between the sleeve and the tubular beam for additional strength and durability. Alternatively, a sealant or aluminum based braze may be applied between the tubular beam and sleeve to exclude fluids from seeping under the sleeve. An adhesive may also be used to form a seal under the sleeve. The crimp may be a band shaped crimped area or a spline shaped crimped area.

According to another aspect of this disclosure, an assembly is provided that comprises a tubular beam and a sleeve assembled over an end portion of the beam. A hem flange secures the sleeve to the beam at the end portion of the beam to provide a sleeve/beam assembly. A steel rail defines an opening that receives the sleeve/beam assembly and a weld secures the sleeve/beam assembly to the rail.

According to other aspects of the disclosure as it relates to the preceding assembly, the hem flange may further comprises a plurality of flanges formed on the sleeve that are formed to extend over an end of the tubular beam. The sleeve may include a plurality of sides that are joined at a plurality of corners, and wherein a portion of the corners are removed from the sleeve to form a plurality of flanges. Conversely, the hem flange may further comprise a plurality of flanges formed on the tubular beam that are formed to extend over an end of the sleeve. The tubular component may include a plurality of sides that are joined at a plurality of corners. A portion of the corners may be removed from the tubular beam to form a plurality of flanges.

Another aspect of this disclosure as it relates to a method of assembling a tubular component to a rail comprises assembling a sleeve formed from a first material to the tubular component formed from a second material that is different than the first material, crimping the sleeve onto the tubular component by compressing the sleeve in a local area into the tubular component, and welding the sleeve to the rail.

According to other aspects of the disclosure, the rail is made from the first material that is the same material that is used to form the sleeve. The method may also comprise the step of applying an adhesive, sealant or braising material between the sleeve and the tubular component. The sleeve may extend outwardly from an end of the tubular component.

According to another aspect of the disclosure as it relates to the method of assembling a tubular component to a rail, the method may comprise assembling a sleeve formed from a first material over a tubular component formed from a second material that is different than the first material. The method may also comprise hemming the sleeve onto the tubular component by folding a flange of one of the sleeve and tubular component over the other of the sleeve and tubular component, and welding the sleeve to the rail.

According to other alternative aspects of the disclosed method, the method may further comprise applying an adhesive between the sleeve and the tubular component. The method may further comprise forming a plurality of flanges on the sleeve that extend outboard from the tubular component before the hemming step and that are folded over an end of the tubular component. Alternatively, the method may further comprise forming a plurality of flanges on the tubular component that extend outboard from the sleeve before the hemming step and that are folded over an end of the sleeve.

The tubular component may include a plurality of sides that are joined at a plurality of corners, and the method may further comprise removing the corners from the tubular component to form a plurality of flanges. Alternatively, the sleeve may include a plurality of sides that are joined at a plurality of corners, and the method may further comprise removing the corners from the sleeve to form a plurality of flanges.

The above aspects of this disclosure and other aspects will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
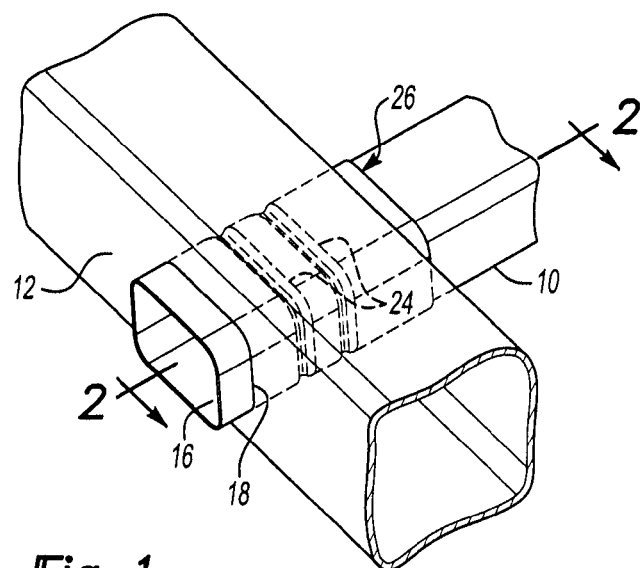
FIG. 1 is a fragmentary perspective view of a tubular beam that is connected through a sleeve to a rail.
Figure 2:
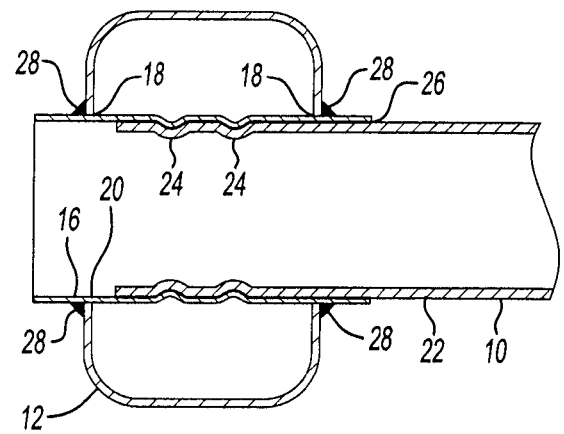
FIG. 2 is a cross-sectional view taken along the line 2-2 in FIG. 1.

Referring to FIGS. 1 and 2, a tubular beam 10 (or tubular component) is illustrated that may be formed of aluminum for the purpose of reducing the weight of the assembly. A box frame rail 12 that is made of steel is also illustrated. A sleeve 16 that is made of steel is assembled to the tubular beam 10 and received in an opening 18 formed in the box frame rail 12. The sleeve has a sleeve ID, or inner surface 20, that is assembled face-to-face with a beam OD, or outer surface 22. The sleeve 20 is secured to the beam 10 by a pair of band-shaped crimps 24 that hold the sleeve 16 onto the tubular beam 10. An adhesive may be applied between the sleeve ID 20 and the beam OD 22 to provide additional strength at the interface between the sleeve 16 and the beam 10. A braze weld or sealant may be applied at one or both ends of the sleeve 16 to prevent moisture from seeping between the sleeve 16 and the tubular beam 10 in the area indicated by reference numeral 26 to join the sleeve 16 to the tubular beam 10. A conventional steel-to-steel weld 28 may be formed around the opening 18 in the box frame rail 12 to secure the sleeve 16 to the rail 12.

It should be noted that in the embodiment of FIGS. 1 and 2, the steel sleeve 16 is welded to the steel box frame rail 12 thereby eliminating any need to weld the aluminum tubular beam 10 to any other part of the assembly.

Figure 3:
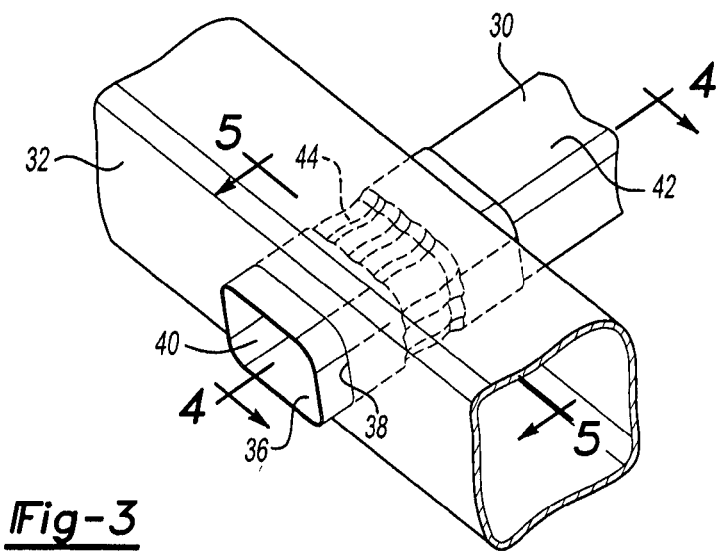
FIG. 3 is a fragmentary perspective view of a tubular beam that is connected through an alternative embodiment of a sleeve to a rail.
Figure 4:
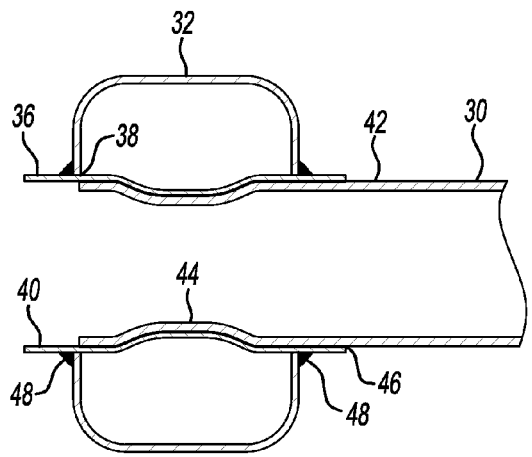
FIG. 4 is a cross-sectional view taken along the line 4-4 in FIG. 3.
Figure 5:
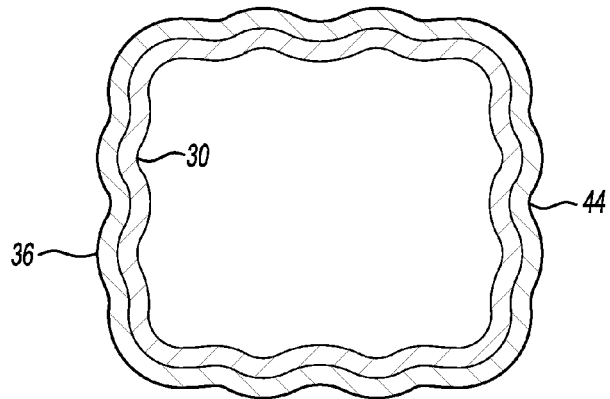
FIG. 5 is a cross-sectional view taken along the line 5-5 in FIG. 3.

Referring to FIGS. 3-5, a tubular beam 30 that is formed from aluminum is shown attached to a box frame rail 32 that may be made of steel. A steel sleeve 36 is assembled to the tubular beam 30 before the tubular beam and sleeve are assembled to the box frame rail 32. The box frame rail 32 defines an opening 38 in which the tubular beam 30 and sleeve 36 assembly is inserted. The inner surface 40 of the sleeve 36 is assembled in a face-to-face relationship with the outer surface 42 of the tubular beam 30.

A spline-shaped crimp 44 is formed on the sleeve 36 and tubular beam 30 to secure the sleeve 36 to the tubular beam 30. An adhesive may be applied between the sleeve 36 and tubular beam 30 to bond the two parts together. The steel sleeve 36 and aluminum tubular component 30 may be sealed by a braze weld or sealant that may be applied at one or both of the outer ends 46 of the sleeve 36. A weld 48 may be provided between the sleeve 36 and the box frame rail 32. The weld 48 may be formed by conventional steel welding processes since the sleeve 36 and box frame rail 32 are both formed of steel.

Figure 6:
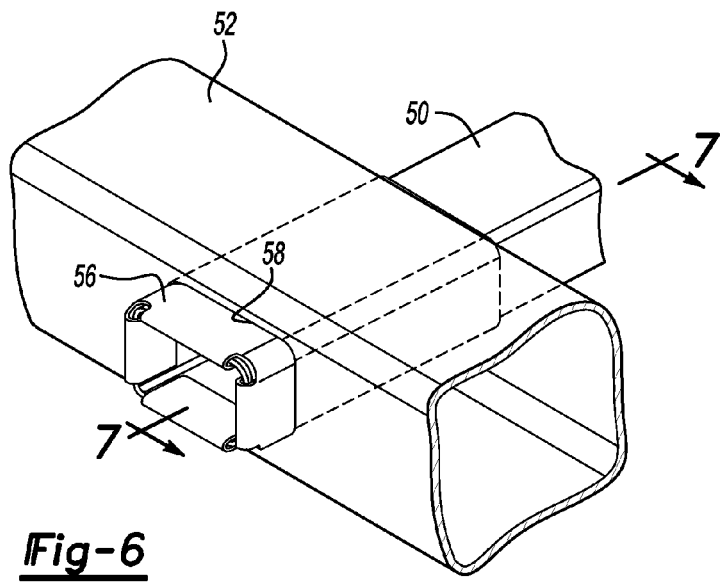
FIG. 6 is a fragmentary perspective view of a tubular beam that is connected to a rail through a sleeve that is retained on the beam by flanges of the sleeve that are hemmed over the beam.
Figure 7:
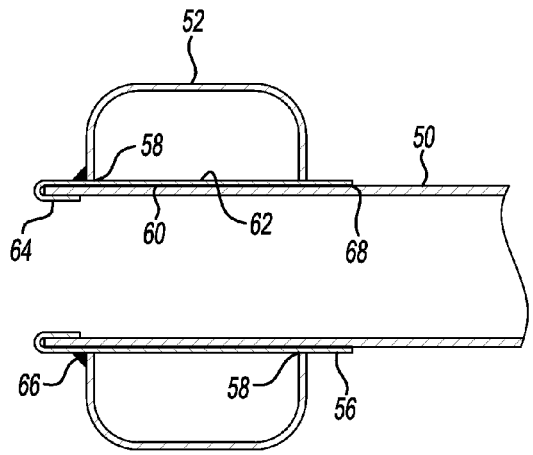
FIG. 7 is a cross-sectional view taken along the line 7-7 in FIG. 6.

Referring to FIGS. 6 and 7, another alternative embodiment of an assembly in which a tubular beam 50 is assembled to a box frame rail 52 with a sleeve 56 disposed between the beam 50 and the box frame rail 52. The sleeve 56 and box frame rail 52 are both formed of steel, while the tubular beam 50 may be formed of aluminum to reduce the weight of the assembly. An opening 58 is provided in the box frame rail 52 in which the assembled sleeve 56 and tubular beam 50 are inserted. The sleeve 56 has an inner surface 60 that is assembled to the tubular beam to be in face-to-face contact with the outer surface 62 of the tubular beam 50. A hem flange 64 is formed on the sleeve 56. The hem flange 64 of the sleeve 56 may be formed by removing the corners of the rectangular-shaped sleeve 56. By removing the corners of the sleeve 56, a flange is provided on each of the sides of the sleeve that are folded inwardly and inside the tubular beam 50. A steel-to-steel weld 66 may be provided between the sleeve 56 and the box frame rail 52 at the opening 58. The steel sleeve 56 may also be sealed to the aluminum tubular beam 50. The braze weld or a sealant may be used in addition to or instead of applying an adhesive between the sleeve 56 and the beam 50.

Figure 8:
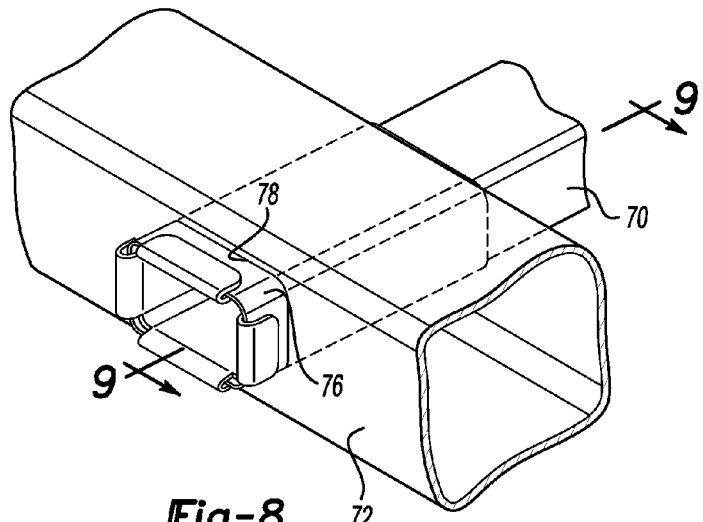
FIG. 8 is a fragmentary perspective view of a tubular beam that is connected to a rail through a sleeve that is retained on the beam by flanges of the tubular beam that are hemmed over the sleeve.
Figure 9:
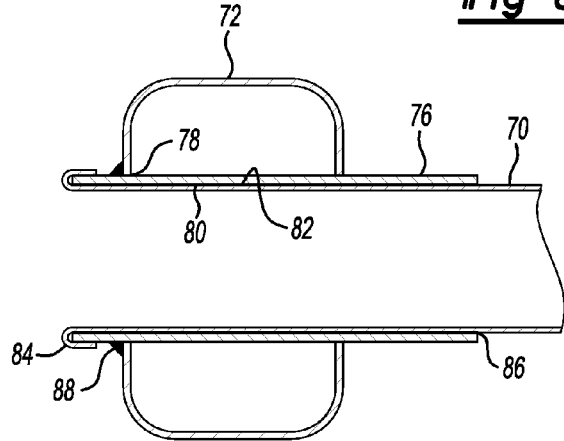
FIG. 9 is a cross-sectional view taken along the line 9-9 in FIG. 8.

Referring to FIGS. 8 and 9, a further embodiment of the assembly is shown in which a tubular beam 70 is secured to a box frame rail 72 through a sleeve 76. The sleeve 76 and box frame rail 72 are preferably formed of the same material, i.e., steel, while the tubular beam 70 may be formed from aluminum or a composite material. An opening 78 is defined by the box frame rail 72 and receives the assembly of the sleeve 76 over the tubular beam 70. The sleeve 76 has an inner diameter 80 that is assembled over the outer diameter 82 of the beam 70. In the embodiment of FIGS. 8 and 9, a hem flange 84 is formed on the tubular beam 70 by removing the corners of the tubular beam to form flanges that extend from the walls of the tubular beam 70. The hem flanges 84 on the tubular beam are formed outwardly to be hemmed against the outside surface of the sleeve 76. As previously described with reference to the above embodiments, an adhesive may be provided at 86 to join the inner diameter 80 of the sleeve 76 to the outer diameter 82 of the beam 70. Conventional steel-to-steel welds 88 may be provided at the juncture of the box frame rail 72 and sleeve 76 as previously described with reference to the embodiments of FIGS. 1-7. The tubular beam 70 may be braze welded to the sleeve 76 or otherwise sealed as previously described.

The method of assembling the tubular beam 10 to the box frame rail 12 is initially described with reference to FIGS. 1 and 2. The sleeve 16 is assembled over the tubular beam 10 with the steel sleeve 16 extending outwardly from the box frame rail 12. The sleeve 16 may extend through both walls of the box frame rail 12. The tubular beam 10 may be inserted through one wall of the box frame rail 12 and may terminate within the box frame rail 12. In this approach, there is no interference with the welding operation where the outer end of the steel sleeve 16 is welded to the steel box frame rail 12. The sleeve 16 is secured to the tubular beam 10 by the band-shaped crimps 24. In addition, an adhesive may be applied between the tubular beam 10 and the sleeve 16 to provide additional strength in the joint between the sleeve 16 and the tubular beam 10.

The method of assembling the tubular beam 30 to the box frame rail 32 with the sleeve 36 is essentially the same as the method of describing the embodiment of FIGS. 1 and 2 except that a spline-shaped crimp 44 is used to hold the sleeve 36 onto the tubular beam 30.

The method of assembling the tubular beam 50 to the box frame rail 52 with a sleeve 56 is performed by first assembling the sleeve 56 over the tubular beam 50. An adhesive may be applied between the ID 60 of the sleeve 56 and the OD 62 of the tubular beam 50. The end of the sleeve 56 may be processed by cutting away the corner portions of the sleeve 56 to form four flanges, one on each side of the sleeve 56. The flanges are then formed over the end of the tubular beam 50 to form the hem flange 64.

In the embodiment of FIGS. 8 and 9, the method of assembling the tubular beam 70 to the box frame rail 72 with the sleeve 76 is generally similar to the method of assembling the embodiment of FIGS. 6-7. The corners of the tubular beam 70 are cut away to provide four flanges on the four sides of the tubular beam 70. The flanges are formed outwardly and over the outer surface of the sleeve 76 to form the hem flange 84. Again, an adhesive may be applied between the sleeve 76 and tubular beam 70 to provide additional holding strength. The welds 88 provided between the box frame rail 72 and the sleeve 76 are conventional steel-to-steel welds.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
an aluminum tubular beam;
a steel sleeve is assembled over the beam;
a crimp interlocks the sleeve to the beam to provide a sleeve/beam assembly;
a steel rail defines an opening that receives the sleeve/beam assembly; and
a weld secures the sleeve/beam assembly to the rail.

2. The assembly of claim 1 further comprising an adhesive applied between the sleeve and the tubular beam.

3. The assembly of claim 1 wherein the crimp is a band shaped crimped area.

4. The assembly of claim 1 wherein the crimp is a spline shaped crimped area.

5. An assembly comprising:
a tubular beam;
a sleeve is assembled over an end portion of the beam;
a hem flange secures the sleeve to the beam at the end portion of the beam to provide a sleeve/beam assembly;
a rail defines an opening that receives the sleeve/beam assembly; and
a weld secures the sleeve/beam assembly to the rail.

6. The assembly of claim 5 wherein the hem flange further comprises a plurality of flanges formed on the sleeve that are formed to extend over an end of the tubular beam.

7. The assembly of claim 6 wherein the sleeve includes a plurality of sides that are joined at a plurality of corners, and wherein the corners are removed from the sleeve to form the plurality of flanges.

8. The assembly of claim 5 wherein the hem flange further comprises a plurality of flanges formed on the tubular beam that are formed to extend over an end of the sleeve.

9. The assembly of claim 8 wherein the tubular component includes a plurality of sides that are joined at a plurality of corners, and wherein the corners are removed from the tubular beam to form the plurality of flanges.

10. The assembly of claim 5 includes an adhesive bonding the sleeve to the tubular beam.

11. A method of assembling a tubular component to a rail comprising:
assembling a sleeve formed from a first material to the tubular component formed from a second material that is different than the first material;
crimping the sleeve onto the tubular component by compressing the sleeve in a local area into the tubular component; and
welding the sleeve to the rail.

12. The method of claim 11 wherein the rail is made from the first material.

13. The method of claim 11 further comprising the step of applying an adhesive between the sleeve and the tubular component.

14. The method of claim 11 wherein the sleeve extends outwardly from an end of the tubular component.

15. A method of assembling a tubular component to a rail comprising:
assembling a sleeve formed from a first material over the tubular component formed from a second material that is different than the first material;
hemming the sleeve onto the tubular component by folding a flange of one of the sleeve and tubular component over the other of the sleeve and tubular component; and
welding the sleeve to the rail.

16. The method of claim 15 further comprising applying an adhesive between the sleeve and the tubular component.

17. The method of claim 15 further comprising forming a plurality of flanges on the sleeve that extend outboard from the tubular component before the hemming step and that are folded over an end of the tubular component to form a plurality of hem flanges.

18. The method of claim 15 further comprising forming a plurality of flanges on the tubular component that extend outboard from the sleeve before the hemming step and that are folded over an end of the sleeve to form a plurality of hem flanges.

19. The method of claim 15 wherein the tubular component includes a plurality of sides that are joined at a plurality of corners, and wherein the method further comprises removing the corners from the tubular component to form a plurality of flanges.

20. The method of claim 15 wherein the sleeve includes a plurality of sides that are joined at a plurality of corners, and wherein the method further comprises removing the corners from the sleeve to form a plurality of flanges.

\* \* \* \* \*